(12) United States Patent
Wilmer et al.

(10) Patent No.: US 9,027,419 B2
(45) Date of Patent: May 12, 2015

(54) PIPETTE

(75) Inventors: Jens Wilmer, Ahrensburg (DE); Holger Link, Hamburg (DE)

(73) Assignee: Eppendorf AG, Hamburg (DE)

( * ) Notice: Subject to any disclaimer, the term of this patent is extended or adjusted under 35 U.S.C. 154(b) by 330 days.

(21) Appl. No.: 13/571,946

(22) Filed: Aug. 10, 2012

(65) Prior Publication Data

US 2013/0199312 A1 Aug. 8, 2013

Related U.S. Application Data

(60) Provisional application No. 61/596,065, filed on Feb. 7, 2012.

(51) Int. Cl.
*G01F 11/02* (2006.01)
*B01L 3/02* (2006.01)

(52) U.S. Cl.
CPC ............. *G01F 11/027* (2013.01); *B01L 3/0279* (2013.01)

(58) Field of Classification Search
CPC ...... G01F 11/027; G01F 11/23; B01L 3/0279
See application file for complete search history.

(56) References Cited

U.S. PATENT DOCUMENTS 4,041,764 A * 8/1977 Sabloewski et al. ....... 73/864.14
2005/0155438 A1 7/2005 Belgardt

FOREIGN PATENT DOCUMENTS

| DE | 25 49 477 | 12/1977 |
|---|---|---|
| DE | 197 08 151 | 9/1998 |
| DE | 10 2004 003 434 | 8/2005 |

* cited by examiner

*Primary Examiner* — Paul West
(74) *Attorney, Agent, or Firm* — Vidas, Arrett & Steinkraus

(57) ABSTRACT

A pipette with a displacement unit, a drive unit, means for the detachable connection that detachably connects together the upper housing part and the lower housing part, an ejection device, an end stop, a decoupling device and coupled to the drive device, a lower stop body that upon decoupling of the drive element from the drive device by the decoupling device strikes the actuating end of the ejection extension in order, with further shifting of the actuating element in the actuating direction, to shift downward the ejection extension and the ejection slide.

16 Claims, 9 Drawing Sheets

PIPETTE

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a pipette with an ejection device for pipette tips.

Pipettes are used particularly in laboratories for dosing liquids. For this purpose, a pipette tip with an upper opening is clamped onto a shoulder of the pipette. The pipette tip can draw up and dispense liquid through a lower opening. Air displacement pipettes comprise a displacement device for air that is connected to the pipette tip communicating through the shoulder. An air buffer is transferred by the displacement device so that the liquid is aspirated into, and discharged out of, the pipette tip. The displacement device is typically a cylinder with a shiftable piston disposed therein.

After use, the pipette tips are detached from the shoulder, and exchanged for a fresh pipette tip. In this way, contamination of the subsequent dosings is avoided. Single-use pipette tips made of plastic are available and economical.

The shoulder for detachably retaining the pipette tips is a conical or cylindrical projection with respect to a housing of the pipette, and a pipette tip can be clamped thereupon with an upper opening adapted for this purpose. This can occur without handling the pipette tip, by pushing the pipette with the shoulder into the upper opening of the pipette tip that is ready in a retainer.

For avoiding contamination, known pipettes have an ejection device with a drive device. By actuating an ejector button, an ejection slide is shifted via an ejection rod such that it detaches the pipette tips from the shoulder without requiring the user to handle the pipette tip. These pipettes have a dosing button for actuating the displacement device and the separate ejector button for actuating the ejection device, such that two buttons must be actuated.

The document, DE 25 49 477 C3, the entire contents of which is incorporated herein by reference, discloses a manual pipette with one-button operation. This pipette has a housing from which an actuating element projects at the top that can be depressed counter to a spring effect, and that is connected via a stroke rod to a movable piston in a cylinder. When actuating the actuating element, the piston executes an adjustable working stroke. To blow out the remaining liquid from the pipette tip, the piston can perform an over-stroke. For this purpose, a separable magnet arrangement is present between the actuating element and the piston-cylinder unit that indicates the end of the working stroke to the user by a resistance, after overcoming of which, the over-stroke is performed. In addition, there is provided an ejection stroke for ejecting the pipette tip. For this purpose, the piston rod has a stop element that can slide an ejection sleeve at an actuating end so that the sleeve with an ejection end pushes the pipette tip at the upper edge thereof from the shoulder. The start of the ejection stroke is indicated to the user by the resistance of a spring acting on the ejection sleeve. During the ejection stroke, the piston is also moved such that free space is required in the cylinder. The free space forms a dead volume that influences the dosing accuracy.

The document DE 197 08 151 A1, the entire contents of which is incorporated herein by reference, describes a further pipette with one-button operation that has a smaller dead volume. The pipette has a movement device, a piston movable by this device in a cylinder for moving air, a fastening shoulder with a connection to the cylinder having an opening for fastening a pipette tip, and a stop for limiting the movement of the piston toward the opening of the fastening shoulder while moving air. The stop is a face surface of the cylinder upon which the piston strikes while pushing air toward the opening of the fastening shoulder. Further, the pipette has an ejection device which has an ejection section for separating a pipette tip from the fastening shoulder during an ejection movement of the ejection device, and an actuating section for effecting the ejection movement. In addition, there is a decoupling device that decouples the piston from the movement device upon reaching the stop. The decoupling device is formed by a magnet arrangement with a magnet and a magnetizable counterpart, which can be separated from each other after overcoming a retention force. A driver coupled to the movement device acts on the actuating section when the piston is decoupled, wherein a movement of the driver by the movement device forces the ejection movement of the ejection device. With this pipette, the movement of the piston after the working stroke, and possibly a blow out stroke for blowing out residual liquid, is limited by the stop. Then, the decoupling device decouples the piston from the movement device. With a further actuation of the movement device in the same direction, the piston is not moved further, however, a driver coupled to the movement device is moved which acts on the actuating section of the ejection device, and forces the ejection movement. The ejection movement without further movement of the piston reduces the dead volume, and improves the dosing accuracy.

In the disclosed pipette, the piston is stressed during contact on the face side of the cylinder, such that it must be designed to be sufficiently stable. With small sizes for small dosing volumes, this is costly. During the assembly, the upper housing part, which comprises the decoupling device and the piston, are screwed together with a lower housing part that comprises the cylinder. During the production of pipettes of different sizes for different dosing ranges, the upper parts of the housing must be populated with different decoupling devices and cylinders, and then combined with the respectively appropriate lower parts of the housing.

The document, DE 10 2004 003 434 B4, the entire contents of which is incorporated herein by reference, describes a pipette with a displacement device and a drive device detachably connected thereto. The displacement device has a displacement chamber with a shiftable boundary, a shoulder for connecting to a pipette tip, and a connecting channel between the displacement chamber and the free end of the shoulder. The drive device for driving the shiftable boundary of the displacement device has a drive element that has a detachble effective connection to the shiftable boundary. A bayonet connection between the drive device and the displacement device can be established by producing the effective connection between the drive element and the shiftable boundary, and can be detached by terminating the effective connection between the drive element and the shiftable boundary. The pipette has a separate ejection device for detaching a pipette tip from the shoulder, which ejection device has an ejection drive disposed separately at the drive device, an ejector disposed at the displacement device, and a detachable axial clamping connection between the ejection drive and ejector directed in the direction of the longitudinal axis of the bayonet connection.

Starting from this background, the object of the invention is to create a pipette that reduces the expense for providing different sizes and is easier to handle.

The objective is solved by a pipette with the features of claim 1. Advantageous embodiments of the pipette are specified in the dependent claims.

BRIEF SUMMARY OF THE INVENTION

The pipette according to the invention has
a displacement unit comprising a rod-shaped lower housing part with a displacement chamber disposed therein with a shiftable boundary, a contact element at an upper housing opening at the top of the lower housing part, the element being connected to the shiftable boundary, a shoulder for connecting to a pipette tip at the bottom of the lower housing part, and a connecting channel between the displacement chamber and the free end of the shoulder,
a drive unit for driving the shiftable boundary of the displacement unit with a rod-shaped upper housing part, a drive device disposed therein, an actuating element at the upper housing part interacting with the drive device, and a drive element interacting with the drive device at a lower opening of the housing at the bottom of the upper housing part, that can be shifted downward in the actuating direction by actuating the actuating element, in order to perform a dosing stroke of the shiftable boundary,
means for the detachable connection that detachably connect together the upper housing part and the lower housing partner into a rod-shaped housing in an arrangement in which the drive element rests on the contact element,
an ejection device which has an ejection slide shiftably disposed at the lower housing part where the ejection slide has at the bottom an ejection end for detaching a pipette tip from the shoulder, and the ejection device further has, disposed on the upper housing part, a shiftable ejection extension that is connected at the bottom to the upper end of the ejection slide,
an end stop disposed fixed to the housing in the upper housing part and connected securely to the upper housing part, and an end stop element securely connected to the drive element for limiting the downward movement of the drive element,
a decoupling device between the drive device and a drive element that decouples the drive element from the drive device in the case of contact of the end stop element at the end stop and continued shifting of the actuating element in the actuating direction, and
coupled to the drive device, a lower stop body that upon decoupling of the drive element from the drive device by the decoupling device strikes an actuating end of the ejection extension in order shift downward the ejection extension and the ejection slide with further shifting of the actuating element in the actuating direction.

The pipette according to the invention has a displacement unit and a drive unit which are detachably connected together by a detachable connection. The detachable connection can be configured as a bayonet connection as described in the document, DE 10 2004 003 434 B4. In this regard, reference is made to the documents DE 10 2004 003 434 B4 and US 2005/155438 A1, the content of which is hereby incorporated by reference into the present application. The displacement unit comprises the displacement chamber and the shiftable boundary. This unit is preferably a cylinder with a piston disposed therein so as to be shiftable. Thus, during assembly of the displacement unit and the drive unit, the piston or another shiftable boundary need not be installed in the displacement unit. The drive device of the drive unit is coupled to the shiftable boundary in that the drive element of the drive unit contacts the contact element of the displacement unit. The contact can be established easily by joining and producing the detachable connection between the displacement unit and the drive unit. Further, the pipette has an end stop, upon which an end stop element connected to the drive element strikes in order to limit the downward shifting of the drive element. In contrast to DE 197 08 151 A1, the end stop is not the lower face surface of the cylinder. Rather, the end stop is disposed in the upper housing part and is securely connected to the upper housing part, and the drive element has the end stop element. Consequently, the piston is not subject to any stresses due to striking the end stop. Particularly in the case of a drive unit that is to be used without change for a pipette series with different sized pipettes, the end stop and the end stop element can be designed so that they can withstand the greatest anticipated forces. It is also possible to use displacement units that are not designed for the piston to strike the face side of the cylinder at the end of the downward shifting. Upon reaching the end stop, the piston is preferably located a short distance before, or directly on, a lower face surface of the cylinder in order to keep the dead volume, and consequently the dosing error, as small as possible. Furthermore, the drive unit has a decoupling device between the drive element and the drive mechanism. Upon contact of the end stop element at the end stop, the decoupling unit decouples the drive element from the drive device if the actuating element is shifted further in the actuating direction. Consequently, the drive device is further moved in the same direction as before. The drive device is coupled to a lower stop body that upon decoupling of the drive element from the drive device strikes the actuating end of the ejection extension. As a result, due to further shifting of the actuating element in the actuating direction, the ejection extension and with it, the ejection slide, is shifted downward. This causes the pipette tip to be pushed off the shoulder. The pipette according to the invention therefore enables controlling the dosing and ejecting pipette tips by actuating only a single actuating element. The displacement chamber and shiftable boundary are not stressed in a disadvantageous manner when discharging the pipette tip. Larger dead volumes, and consequent dosing errors, are avoided. The fundamental design of the pipette comprising the displacement unit and the drive unit facilitates the assembly and disassembly. In addition, the displacement unit and the drive unit can be used in order to assemble different types of pipettes. The displacement units, in particular, that are not originally constructed to perform the control of the dosing procedure and the ejection procedure using only one actuating element, can be used with the drive unit in order to form a pipette with one-button operation. Furthermore, the same drive unit can be combined with different displacement units in order to form pipettes with different dosing ranges.

The actuating element cooperates with the drive device in that it is either directly or indirectly mechanically connected thereto. The drive element cooperates with the drive device in that it is either directly or indirectly mechanically connected thereto. The actuating direction of the actuating element preferably proceeds in a straight line. Moreover, it preferably progresses in the longitudinal direction of the rod-shaped housing. Alternatively, it can progress at an angle (example 45° for 90°) to the longitudinal direction. According to another alternative, the actuating direction progresses along a curve, for example along a circular path. For a straight line actuating device, the actuating element is preferably a push button, and for a curved actuating device, the actuating element is preferably a pivotable lever.

According to one design, the pipette is a manual pipette, that is, a pipette that can be held and operated for pipetting by the user in only one hand.

According to a further design, the drive unit has a stop element and an upper stop body and the lower stop body, between which the stop element can be shifted in order to perform a dosing stroke, wherein the lower stop body is supported using an over-stroke spring in the upper housing part, in order to perform an over-stroke after performing a dosing stroke, by further shifting of the actuating element in the actuating direction counter to the spring force of the over-stroke spring up to reaching the end stop due to the end stop element. During dosing stroke, the stop element moves between the upper and lower stop body, wherein for suctioning liquid into a pipette tip placed on the shoulder, the stop element is shifted from the lower stop body to the upper stop body, and for discharging air or fluid from the pipette tip is moved from the upper stop body to the lower stop body. The user detects the strike of the stop element because the lower stop body is supported using an over-stroke spring in the upper housing part. As a result, it is guaranteed that exactly the intended dosing stroke is performed during the intake of liquid. During release of liquid, the user can additionally perform an over-stroke in order to blow out residual liquid from the pipette tip. By applying an increased force on the actuating element, the user can overcome the spring force of the over-stroke spring and affect an over-stroke until the drive element is stopped by the end stop. After the over-stroke, the user can control ejecting the pipette tip in the described manner, in that the user, by applying an appropriate force on the actuating body, decouples the decoupling device.

At the end of the over-stroke, or at the start of a further movement of the actuating element in the actuating direction, the lower stop body sits with the outer edge thereof on the actuating end of the ejection extension in order to shift the ejection extension downward as a driver. As a result, the lower stop body fulfills the function of limiting the dosing stroke, permitting the over-stroke and controlling ejection of the pipette tip, in a manner that is advantageous and reduces the construction expenditure. In addition, with this design the ejection extension can be guided laterally past the over-stroke devices, past the drive element and the decoupling device. In addition, space is thereby created beneath the over-stroke device for an ejection spring for resetting the ejection mechanism into an initial position, in which a pipette tip can be placed on the shoulder.

According to a further design, the upper stop body can be shifted in the upper housing part, and the upper housing part has an adjustment device coupled to the upper stop body that is used for adjusting the position of the upper stop body and determining the dosing stroke. The quantity of liquid to be dosed can be adjusted by means of the adjustment device. According to a further design, the upper stop body is a threaded spindle that has an upper passage channel through which passes a stroke rod of the drive device. The treaded spindle is disposed so as to rotate by means of the adjustment devices in a spindle nut in the upper housing part and securely connected thereto, and is thereby axially shiftable. The lower face surface of the threaded spindle serves as a stop for the stop element. The position of the lower face surface defines the dosing stroke.

According to one design, the stop element is a collar on the periphery of stroke rod, and the stroke rod passes through an upper passage channel of the upper stop body and through a lower passage channel of the lower stop body, and the collar is disposed between the upper stop body and the lower stop body.

According the further design, the decoupling device has two decoupling elements of which one decoupling element is connected to the drive device and the other decoupling element is connected to the drive element, wherein the decoupling elements are held together detachably in a specific connection position, and can be separated from each other after overcoming a specific retaining force, and can be moved back into the retaining position. The decoupling device can be integrated simply between the drive device and the drive element. The decoupling device is not decoupled until, by means of actuating the actuating elements, the force acting on the decoupling device overcomes the retaining force. Therefore, the user detects a resistance at the end of releasing liquid from the pipette tip. This makes it easier for the user to initially align the pipette on a receptacle in order to perform a dosing, and then to align the pipette on a waste container for pipette tips in order to eject the pipette tip with increased actuation force. The maximum retaining force is preferably 25N, further preferably at most 22N. Preferably the minimum retaining force is 10N, further preferably at least 16N. The minimum is preferably 19N.

According to one design, the decoupling elements comprise two magnets, or one magnet and a ferromagnetic counterpart, and/or one latch device and/or one spring device, which detachably retain the decoupling elements in the connection position. The decoupling elements preferably have a magnetic arrangement with two magnets, or one magnet and a ferromagnetic counterpart. The magnet is preferably a permanent magnet.

The decoupling device can be designed in particular as described in the document DE 197 08 151 A. In this regard, reference is made to the document DE 197 08 151A, the content of which is hereby incorporated by reference into this application.

According to the further design, the drive element is a sleeve, the lower end of which rests on the contact element, the decoupling device comprises an upper decoupling element with an upper passage hole, that is disposed in the sleeve and is securely fastened thereto, and a lower decoupling element that is movably disposed in the sleeve and is fixed at the lower end of a stroke rod which extends from above into the sleeve and through the upper passage hole, and the sleeve extends through a further passage hole of the end stop, and has a further collar projecting radially outward that limits the downward movement of the drive element by resting on the top side of the end stop. In this design, the decoupling device is integrated into the drive element in a space saving manner. The decoupling device can be assembled with the drive element on the stroke rod of the drive device. The end stop element is simply realized by a further collar of the sleeve.

According to a further design, a decoupling spring is disposed in the sleeve at the bottom of the lower decoupling element, and by means thereof the decoupling element is supported in the sleeve. The decoupling spring, after releasing the actuating element, presses the lower decoupling element back toward the upper decoupling element in order to return the decoupling element into the connection position.

According to a further design, the sleeve has a lower sleeve section and an upper sleeve section, wherein the lower sleeve section has a smaller diameter than the upper sleeve section, extends through the upper housing opening of the lower housing part, and the lower end rests on the contact element, and the decoupling elements are disposed in the upper sleeve section. This provides sufficient construction space for housing the decoupling elements, and enables inserting the sleeve into an upper housing opening with the small diameter of a displacement device.

According to a further design, the over-stroke spring is supported on an annular over-stroke spring bearing in the upper housing part, the sleeve passes through the passage hole of the over-stroke spring bearing, and the over-stroke spring bearing is the end stop for the collar of the sleeve. This combines the function of the over-stroke spring bearing and the end stop, and reduces the constructive expense.

According to a further design, the ejection extension is supported by an ejection spring disposed in the upper housing part below the over-stroke spring bearing in the upper housing part.

According to a further design, the ejection spring is supported at the top at an upper ejection spring bearing at the ejection extension, disposed below the over-stroke spring bearing, and supported at the bottom at a lower ejection spring bearing fixed to the housing.

According to a further design, the ejection slide is an ejection sleeve that is guided at the inner periphery at the lower housing part. The ejection sleeve has the shape of a sleeve. According to a further design, the ejection extension has multiple parallel rods that are connected together at a distance from the ejection extension by an annular upper ejection spring bearing. The design of the ejection slide as a sleeve enables a simple assembly at the displacement unit. Likewise, it is easy to assemble and disassemble the ejection slide for cleaning, maintenance or repair. The implementation of the ejection extension with multiple parallel rods favors space saving guidance in the upper housing part. The rods are stabilized in the upper region by the annular ejection spring bearing, and prevented from being unintentionally removed from the upper housing part.

According to a further design, the ejection slide and the ejection extension are connected together by at least one snap connection. A snap connection facilitates assembly, and likewise disassembly, of the ejection slide and the ejection extension.

According to a further design, the ejection extension is connected to an ejection ring by a first snap connection, and the ejection ring is connected to the ejection slide by a second snap connection. This favors the captive assembly of the ejection extension at the top and the ejection ring at the bottom at the upper housing part, and favors the separate assembly of the ejection slide at the lower housing part and the connection of the upper and lower parts of the housing, and simultaneous connection of the ejection ring to the ejection slide.

According to a further design, the upper stroke spring and/or the decoupling spring and/or the piston spring and/or the ejection spring is/are a helical spring and/or a conical spring. Helical springs, or respectively or conical springs, can be advantageously placed in the rod-shaped housing, and can be provided with suitable spring stiffness.

BRIEF DESCRIPTION OF THE SEVERAL VIEWS OF THE DRAWINGS

The invention is explained in the following in more detail using exemplary embodiments in the drawings. The drawings show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In the present application the specifications "top" and "bottom", "above" and "below", and "horizontal" and "vertical" relate to an alignment of the pipette, in which the housing with the shoulder is aligned vertically downward. In this alignment, a pipette tip attached to the shoulder can be directed at a vessel located beneath it, in order to suction and dispense liquid.

Figure 1:
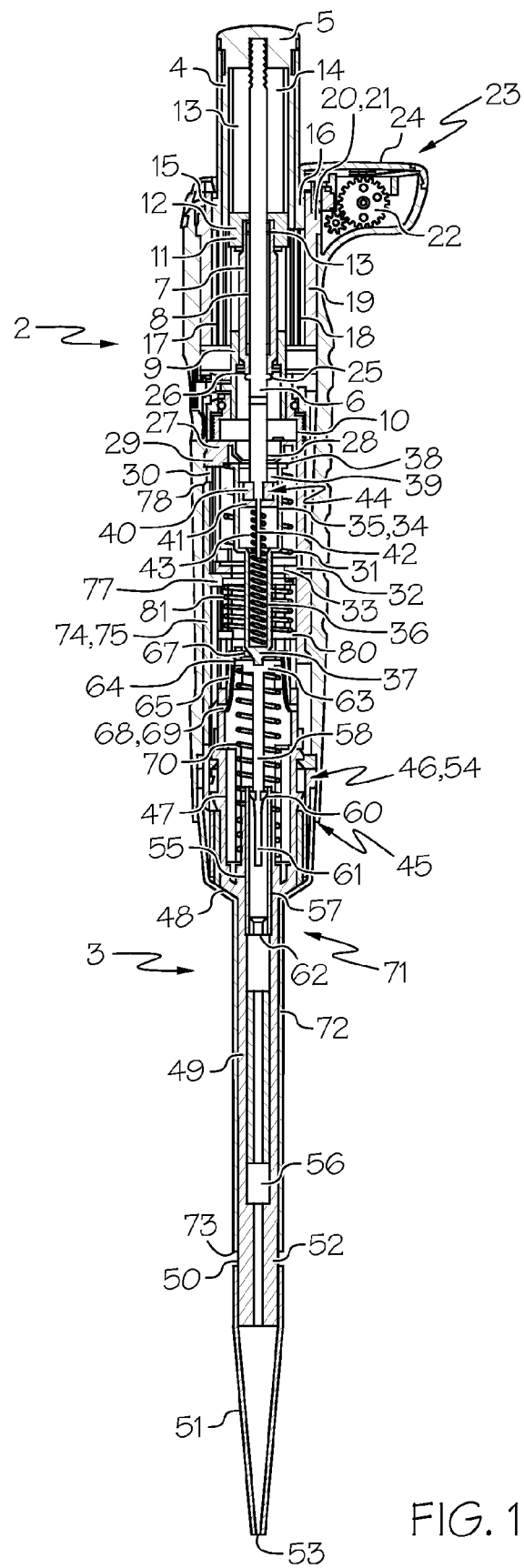
FIG. 1 a longitudinal section of a pipette according to the invention.
Figure 2:
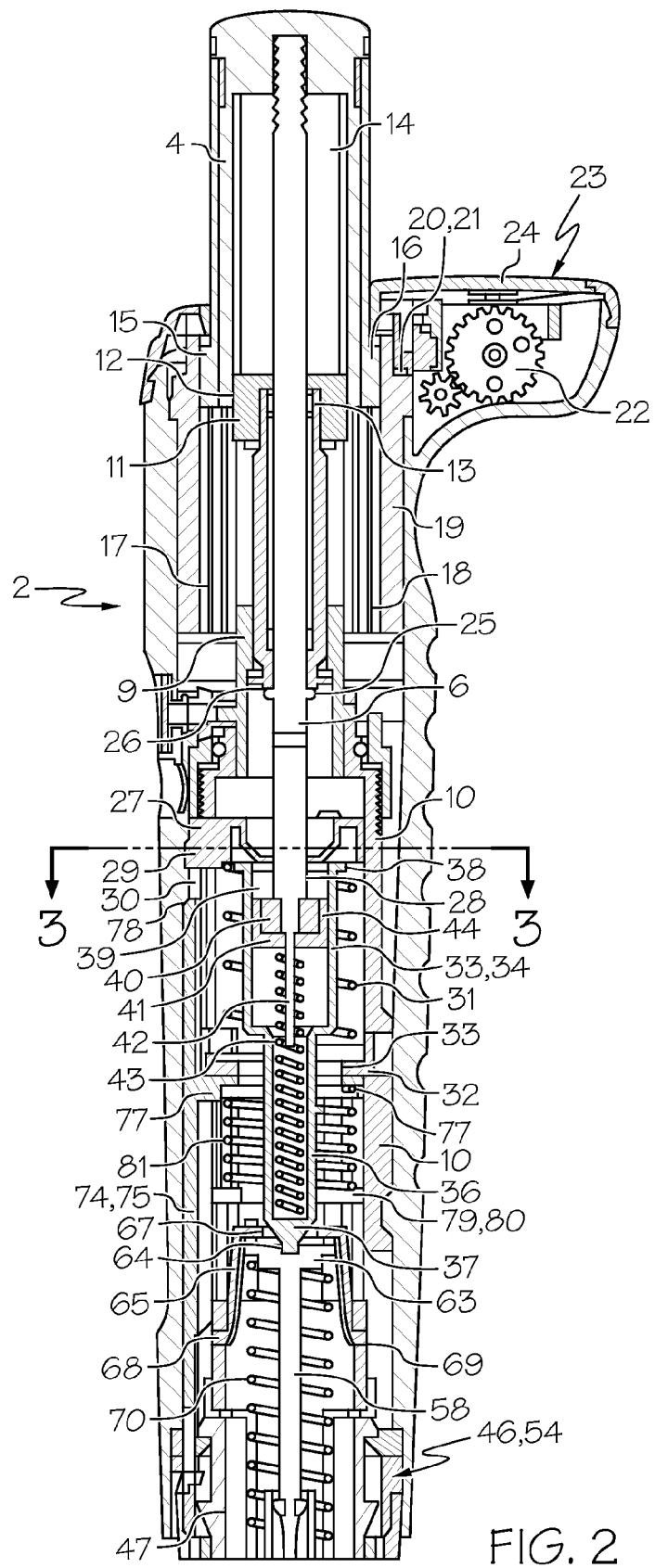
FIG. 2 an enlarged longitudinal section through an upper part of the same pipette.

According to FIG. 1 and FIG. 2, the pipette 1 has a rod-shaped housing formed as a handle with an upper housing part 2 and a lower housing part 3. The upper housing part 2 with all of the contained parts forms a drive unit, and the lower housing part 3 with all of the contained parts forms a displacement unit. An actuating element 4 in the shape of a cylindrical push button projects upward from the upper housing part 2. The actuating element 4 is supported in the upper housing part 2 such that it is axially slidable and can rotate.

The actuating element 4 is screwed tightly to a thread in a cover 5 on a cylindrical stroke rod 6. The stroke rod 6 is guided in the upper housing part 2 through an upper passage channel 7 of a threaded spindle 8. The threaded spindle 8 is screwed into an internal thread of a spindle nut 9 held in a defined position in the upper housing part 2.

The spindle nut 9 is securely connected to a stroke body 10 that is fastened in the upper housing part 2. The stroke body 10 is substantially cylindrical, and is a carrier for the spindle nut 9, the threaded spindle 8 that is screwed therein, and the stroke rod 6 guided therein. During the assembly of the pipette, these and further components are preassembled on the stroke body 10, the stroke body 10, populated with the components is assembled in the upper housing part 2 such that it is securely held in the upper housing part 2. For this purpose, the stroke body 10 is latched to the upper housing part 2. In principle, the components that are preassembled on the stroke body 10 can also be directly assembled in the upper housing part 2. For this purpose, the upper housing part 2 can be equipped internally corresponding to the stroke body 10.

The threaded spindle 8 has at the top a spindle driver 11 to which it is connected in a rotationally fixed manner. The spindle driver 11 has a hexagon 12 at the periphery, with a central hole 13. The hexagon 12 engages in an internal hexagon 14 of the actuating element 4.

The actuating element 4 has at the bottom thereof two diametrically opposed radial projections 15, 16 that project outward. Preferably, there are four radial projections 15, 16. The radial projections 15, 16 engage in axially running grooves 17, 18 on the interior of a hollow cylindrical transfer part 19 that is supported in the upper housing part 2 so as to rotate. The transfer part 19 at the top on an outer periphery, has a sprocket 20 which meshes with a cogged wheel of a counter gearing mechanism 21 that drives several counter wheels 22 of a counter 23 that are disposed next to each other on a horizontal axis. The counter 23 is fastened to the upper housing part. The counter wheels 22 respectively have numbers from 0 to 9. The rearmost, with respect to FIG. 1, counter wheel 22 is driven by the counter gearing mechanism 21. The counter wheels 22 disposed next to it are respectively further rotated by one number when the counter wheel disposed behind it transitions from 9 to 0.

Above the counter 23, the upper housing part 2 has a housing cover 24 with a window through which the numbers of the counter wheels 22 can be read.

A bead-like collar 25 is disposed as a stop element on the stroke rod 6 beneath the threaded spindle 8. The upward shift of the stroke rod 6 is limited by the collar 25 contacting the lower face side 26 of the threaded spindle 8, which forms an upper stop body for the collar 25.

A substantially disc-shaped lower stop body 27 is disposed in the stroke body 10 beneath the threaded nut 9. A lower passage channel 28 is centrally disposed in a cup-shaped indentation in the lower the stop body 27. Further, the lower stop body 27 has three projections 29, projecting radially outward, that are uniformly distributed about the periphery thereof.

Figure 3:
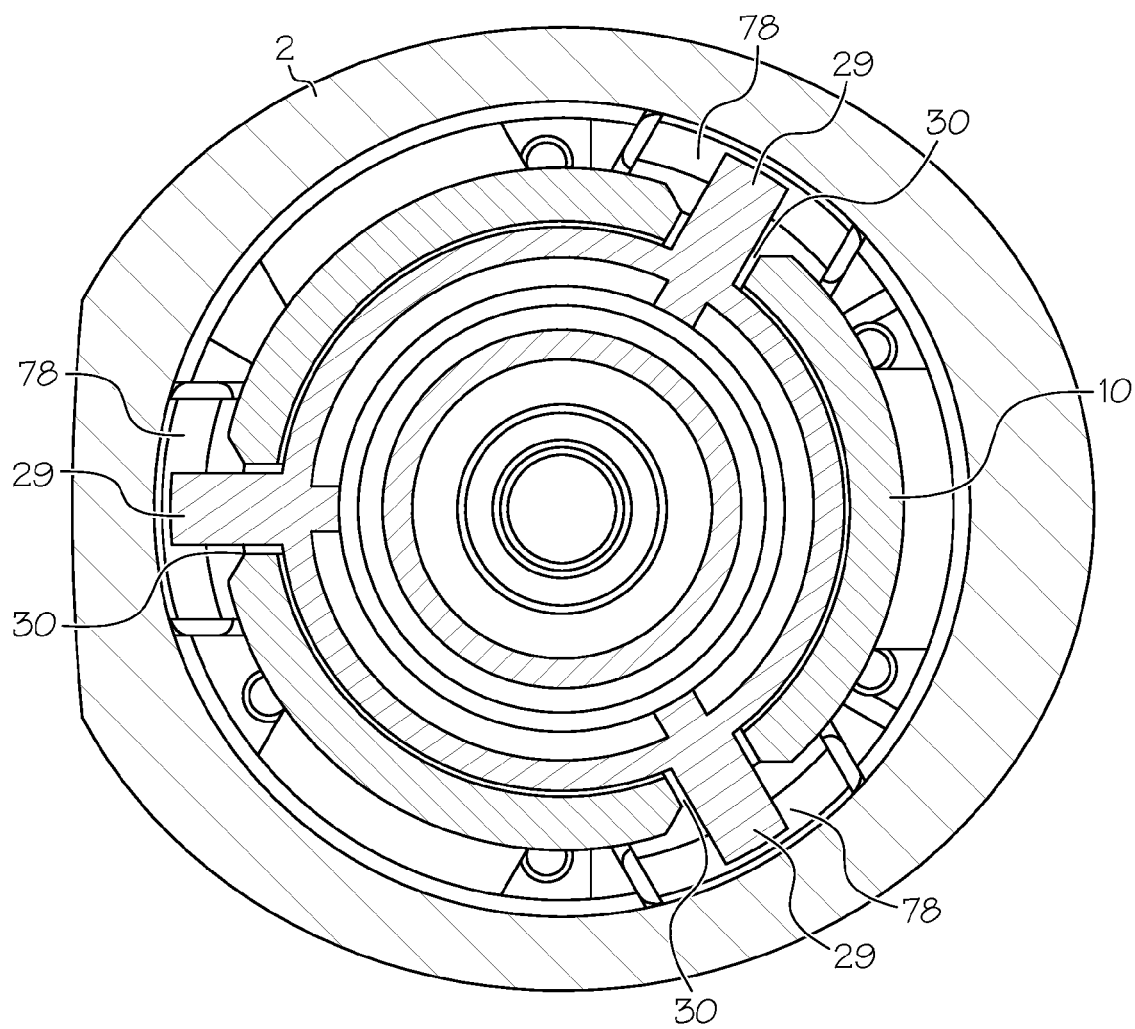
FIG. 3 an enlarged section along the line III-III from FIG. 2.

The lower stop body 27 is guided at the projections 29 in axially progressing guidance slots 30 of the stroke body 10. This is also shown in FIG. 3. The lower stop body can be shifted upward until the projections 29 contact at the upper end of the guidance slots 30.

An over-stroke spring 31 formed as a helical spring is disposed in the stroke body 10 beneath the lower stop body 27. At the top, the over-stroke spring abuts the lower side of the lower stop body 27. At the bottom, the over-stroke spring 31 is supported in an over-stroke spring bearing 32 in which it is disposed and securely fastened thereto.

The over-stroke spring bearing 32 is formed by a ring with an L-shaped cross section, wherein the horizontal leg of the L-profile frames a central through hole 33 in the over-stroke spring bearing 32. The over-stroke spring 31 is supported on the horizontal leg of the L-profile, and is bordered laterally by the vertical leg. The over-stroke spring 31 presses the lower stop body 27 with the projections 29 under pretension against the upper ends of the guidance slots 30.

A drive element 34 in the shape of a sleeve aligned coaxially to the stroke rod 6 is present in the stroke body 10 beneath the lower stop body 27. The drive element 34 has an upper sleeve section 35 and a lower sleeve section 36, wherein the upper sleeve section 35 has a larger inner and outer diameter than the lower sleeve section 36. The lower sleeve section 36 has a truncated cone-shaped tip 37 at the bottom.

A further circumferential collar 38, projecting radially outward, is at the upper edge of the upper sleeve section 35. The outer diameter of the upper sleeve section 35 is less than the inner diameter of the through hole 33 of the over-stroke spring bearing 32, so that the lower and the upper sleeve section 35, 36 can be inserted into the through hole 33. The outer diameter of the further collar 38 exceeds the inner diameter of the through hole 33 such that the drive element 34 cannot completely pass the through hole 33. The over-stroke spring bearing 32 forms an end stop, and the further collar 38 forms an end stop element, which limits the downward shift of the drive element 34.

A hollow cylindrical anchor 39 made of a ferromagnetic material is disposed at the top in the upper sleeve section 35. A hollow cylindrical magnet 40 is disposed beneath that in the upper sleeve section 35. Beneath that, there is a pot 41 for receiving the magnet 40. The anchor 39 has a press fit in the upper sleeve section 35. The stroke rod 6 extends slideably through the central hole of the anchor 39. The stroke rod 6 has a needle-shaped section 42 with a reduced diameter below the anchor. The magnet 40 and the pot 41 are seated on the needle-shaped section 42. The magnet 40 and the pot 41 are preferably fastened to the needle-shaped section 44, for example, in that they are press fit there. In addition, the magnet 40 is supported at the top at a shoulder of the stroke rod, from which the needle-shaped section 44 emanates.

Below the ring disc 41, a decoupling spring 43 formed as a helical spring is guided on the needle-shaped section 42, and the spring is supported at the bottom 43 of the lower sleeve section 36. The anchor 39, magnet 40 and decoupling spring 43 are components of a decoupling device 44.

According to FIGS. 1, 2, 5, and 6, the upper housing part 2 has means, not described in more detail, at the bottom next to a lower housing opening 45 at the inner periphery, for the detachable connection 46 to the further means for the detachable connection of the lower housing part 3.

The lower housing part 3 at the top, has a hollow cylindrical section 47 at which abuts from below a short upper hollow cone section 48 with a large cone angle, at which abuts, in turn, a long lower hollow cone section 49 with a small cone angle, which with the lower end thereof forms a conical shoulder 50 for clamping on a pipette tip 51. A clamped on pipette tip 51 is likewise substantially conical, with an upper opening 52 for attaching onto the shoulder 50, and a lower opening 53 for the passage of liquid. The upper opening 52 is substantially larger than the lower opening 53, and the pipette tip 51 tapers from the upper to the lower opening.

In order to detachably connect the lower housing part 3 and the upper housing part 2, the hollow cylindrical section 47 of the lower housing part 3 has at the top at the outer periphery further means, not described in more detail, for the detachable connection 54, which are matched to the means for the detachable connection 46 of the upper housing part 2. Suitable means for the detachable connection 46, 54 of the upper housing part 2 and the lower housing part 3 are described in the document DE 10 2004 003 434 B4. In this regard, reference is made to the documents DE 10 2004 003 434 B4 and US2005/155438 A1, the content of which is hereby incorporated by reference into the present application.

The lower hollow cone section 49 has at the top an extension 55 projecting in the lower housing part 3 beyond the upper hollow cone section 48.

The lower hollow cone section 49 has a connecting channel 56 that connects the upper face side of the extension 55 to the lower face side of the shoulder 50.

An arrangement comprised of a cylinder 57 with a shiftable piston 58 therein, is disposed in the lower housing part 3. The cylinder 57 with a lower region is inserted into the connecting channel 56, and fastened therein by a press fit or bonding in place. At the bottom, the cylinder 57 is sealed with respect to the connecting channel 56 by means of an O-ring 59.

The piston 58 has a piston seal 60 at the periphery which seals at the inside at the cylinder 57. Beneath the piston seal 60, the piston 58 has a needle-shaped extension 61 which can be inserted into a through opening 62 in the bottom of the cylinder 57 and into the connecting channel 56, in order to reduce the dead volume. The cylinder 57 and the piston 58 are aligned vertically. At the top, the piston 58 supports a horizontally aligned piston plate 63 of which at the center has a vertically aligned conical indentation 64 for receiving the tip 37 of the drive mechanism 34.

The lower housing part 3 has at the top a pot-shaped end cap 65 with a cylindrical or conical casing. The bottom of the end cap 65 is disposed above the piston plate 63, and has a central upper housing opening 67 through which the piston plate 63 is accessible from above. The end cap 65, at the edge of the casing thereof, has outward projecting projections 68 which are snapped into corresponding indentations 69 of the hollow cylindrical section 47 of the lower housing part 3.

The bottom of the end cap 65 limits the upward shifting of the piston 58. A piston spring 70 designed as a helical spring which is supported at the bottom at the extension 55 and at the top at the bottom side of the piston plate 63, pretensions the piston 58 against the bottom side of the end cap 65.

In addition, the pipette 1 has an ejection device 71. The ejection device 71 comprises an ejection slider 72, which is disposed on the lower housing part 3. The ejection slider 72 has a contour matched to the contour of the hollow cylindrical section 47 of the upper hollow cone section 48 and the lower hollow cone section 49. The slider has a circular ring-shaped ejection end 73 at the bottom. The ejection end 73, in the position of the ejection slide 72 from FIG. 1, is pushed upward as far as possible on the lower housing part 3 such that the conical shoulder 50 is exposed for attachment of a pipette tip 51.

At the top, the ejection slide 72 is connected to an ejection extension 74. This extension comprises three vertical ejection rods 75 that are connected to the upper edge of the ejection slider 72. The ejection rods 75 are uniformly distributed over the upper edge of the ejection slider 72. The ejection rods 75 are connected at the bottom via a first snap connection to an ejection ring 76 that is connected via a second snap connection to the upper edge of the ejection slider 72. The ejection rods 75 are connected together, at the top, at a spacing from the ejection ring 76, at the inner periphery thereof by an annular upper ejection spring bearing 77. The upper ejection spring bearing 77 has an L-shaped cross section, wherein the horizontal leg of the cross section is adjacent to the through hole 33 beneath the over-stroke spring bearing 32. The vertical circumferential leg of the upper ejection spring bearing 77 points downward.

At the top, the ejection rods 75 have actuating ends 78.

The ejection extension 74, or respectively the ejection rods 75, extend through the lower housing opening 45 into the upper housing part 2. The upward shifting of the ejection extension 74 is limited by the upper ejection spring bearing 77 contacting at the bottom side of the over-stroke spring bearing 32.

Figure 4:
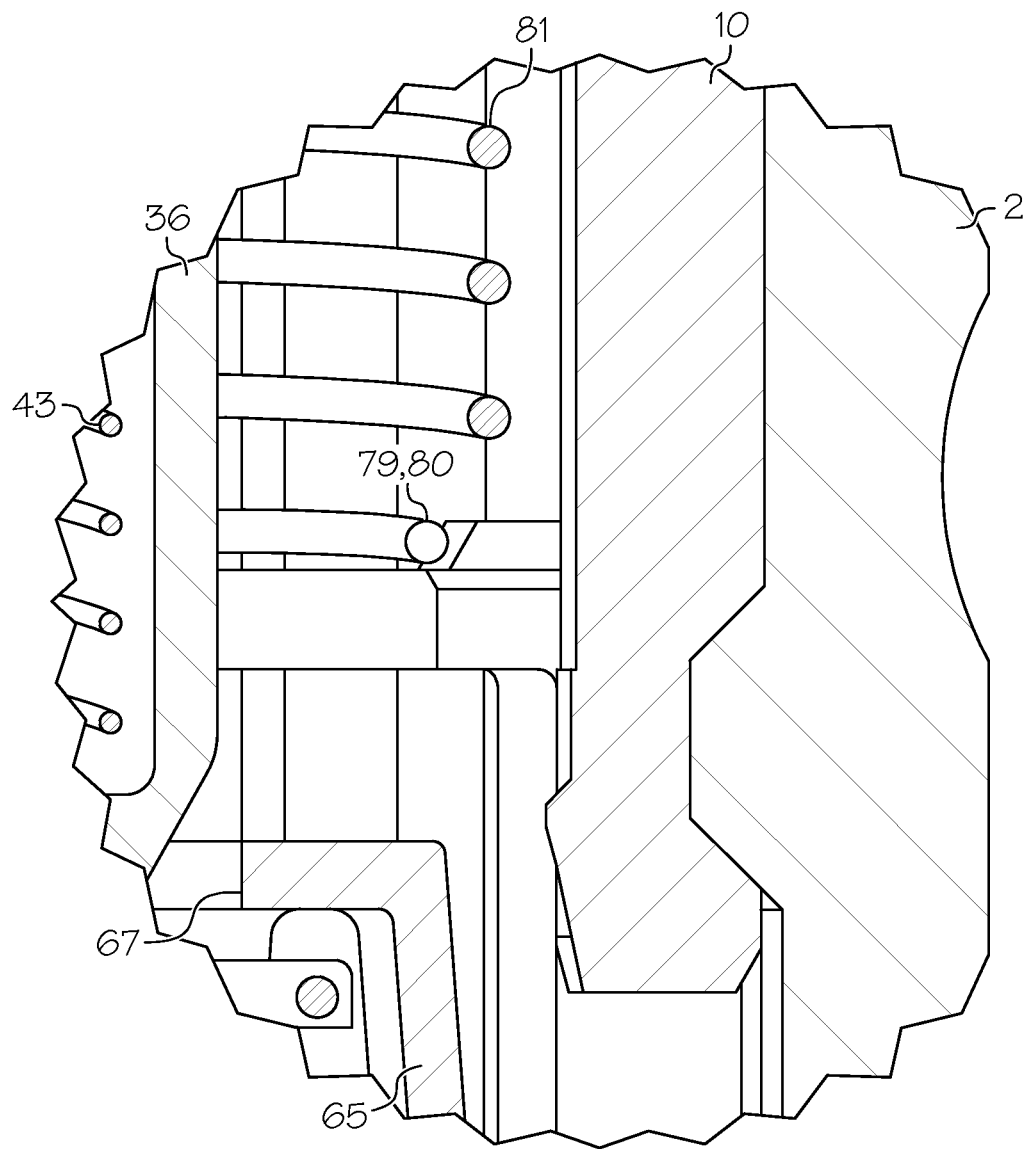
FIG. 4 enlarged detail IV from FIG. 2.
Figure 5:
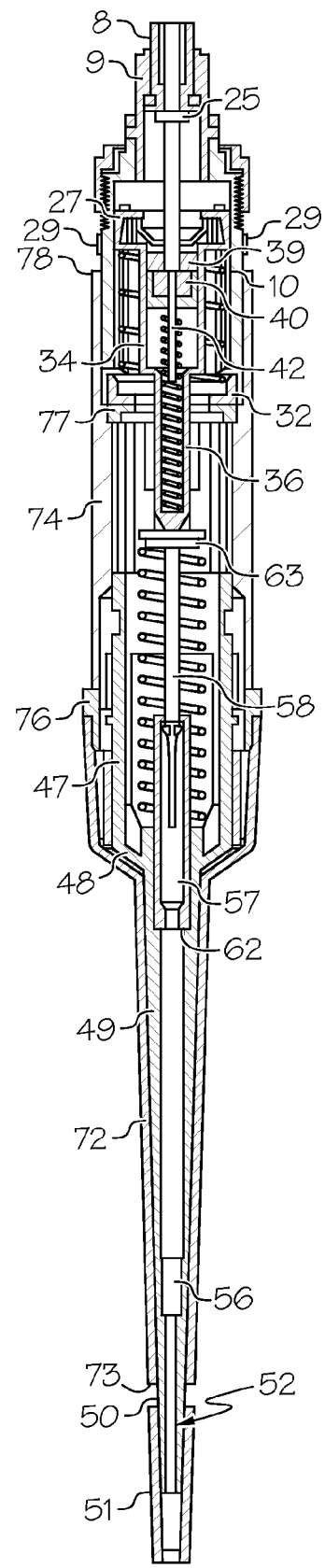
FIG. 5 the same pipette in an enlarged longitudinal section through a lower part.
Figure 6:
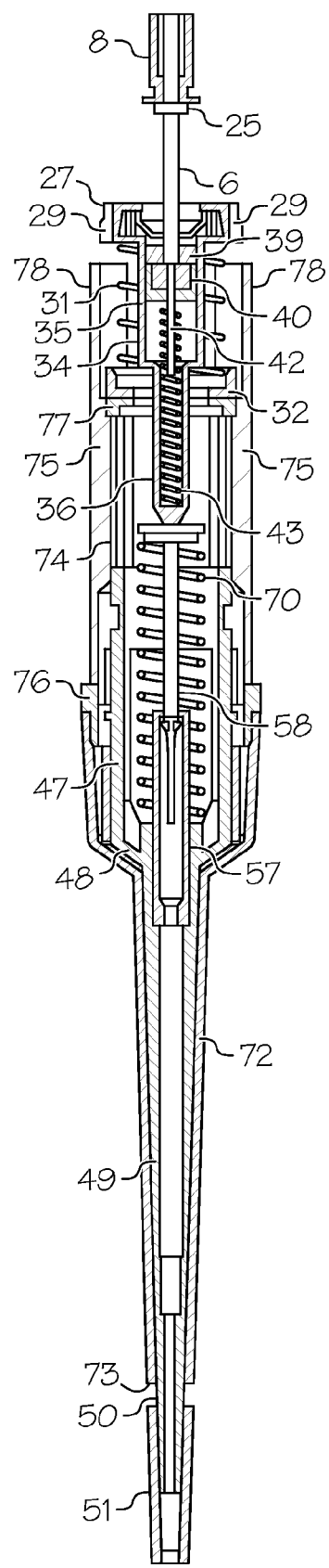
FIG. 6 the same pipette without stroke body in an enlarged longitudinal section through a lower part.

Beneath the upper ejection spring bearing 77, three webs 79 project from the interior of the upper housing part 2 and are disposed uniformly distributed over the interior periphery, and engage through recesses of the stroke body 10. This is shown particularly in FIG. 4. The webs 79 form a lower ejection spring bearing 80. An ejection spring 81 designed as a helical spring is disposed with pretensioning between the upper ejection spring bearing 77 and the lower ejection spring bearing 80, and presses the ejection device 71 upward, so that the upper ejection spring bearing 77 abuts the over-stroke spring bearing 32.

An upper region of the hollow cylindrical section 47 of the lower housing part 3 is guided into the lower housing opening 45 of the upper housing part 2. The means for detachable connection 46, 54 of the lower housing part 3 and the upper housing part 2 are detachably connected together. The drive mechanism 34 engages with the tip 37 into the upper housing opening 67, and rests in the indentation 64 in the piston plate 63. The piston plate 63 presses the drive mechanism 34 upward, and via the decoupling device 44, the stroke rod 6 is pressed with the collar against the threaded spindle 8. The pipette 1 can be used as follows:

The pipette is held at the upper housing part 2. A dosing stroke is adjusted in that the actuating element 4 is rotated until the counter wheels 22 display the desired dosing volume. While rotating the actuating element 4, the threaded spindle 8 is rotated via the spindle driver 10, and is axially shifted due to the threaded connection thereof to the spindle nut 9 that is stationary in the upper housing part 2. Here, the spindle driver 10 glides in the interior hexagon of the actuating element 4. At the same time, the transfer part 19 rotates via the further radial projections 15, 16, and the counter 23 is adjusted. Consequently, the set axial position of the threaded spindle 8 in the upper housing part 2, and thus, the dosing volume can be read at the counter 23.

Further, a pipette tip 51 is clamped on the shoulder 50, preferably in that the shoulder is pressed into a pipette tip 51 that is available in a retainer.

Before suctioning liquid, air is discharged out of the cylinder 57, in that the piston 58 is pressed downward by means of the actuating element 4, until the further collar 38 strikes on the lower strike body 27. Here, a stroke rod 6 moves the drive element 34 downward via the decoupling device 44, and the piston 58 is pressed deeper into the cylinder 57. The decoupling device 44 is not decoupled due to the force between the magnet 40 and the anchor 39.

Afterwards, using the pipette 1, the lower end of the pipette tip 51 is dipped into the liquid, and the desired quantity is suctioned into the pipette tip 51 by releasing actuating element 4. Here, the piston spring 70 presses the piston 58, and thus, the drive element 34 and the stroke rod 6 back into the initial position, in which the collar 25 abuts the threaded spindle 8.

This situation of the pipette 1 is shown in the FIGS. 1, 2, 5, 6 and 7a.

Figure 7A:
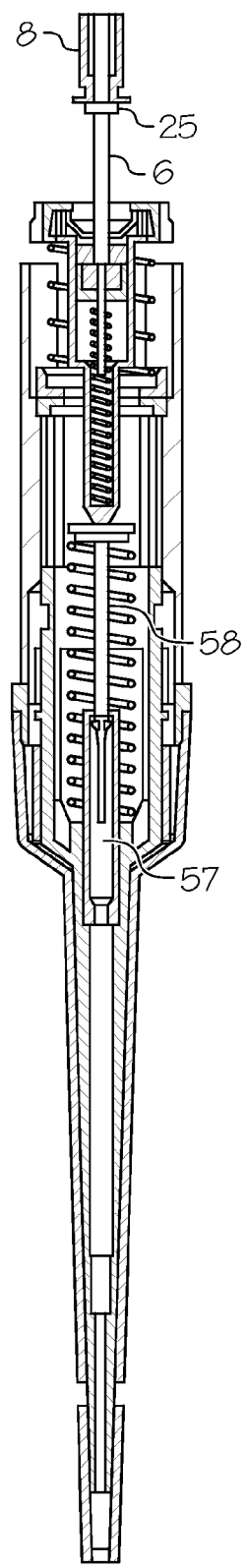
FIG. 7a to d the same pipette, respectively in a partial longitudinal section, before actuating the actuating element (FIG. 7a), after the completed dosing stroke and before performing the over-stroke (FIG. 7b), after performing the over-stroke and before ejecting the pipette tip (FIG. 7c), and after ejecting a pipette tip (FIG. 7d)
Figure 7B:
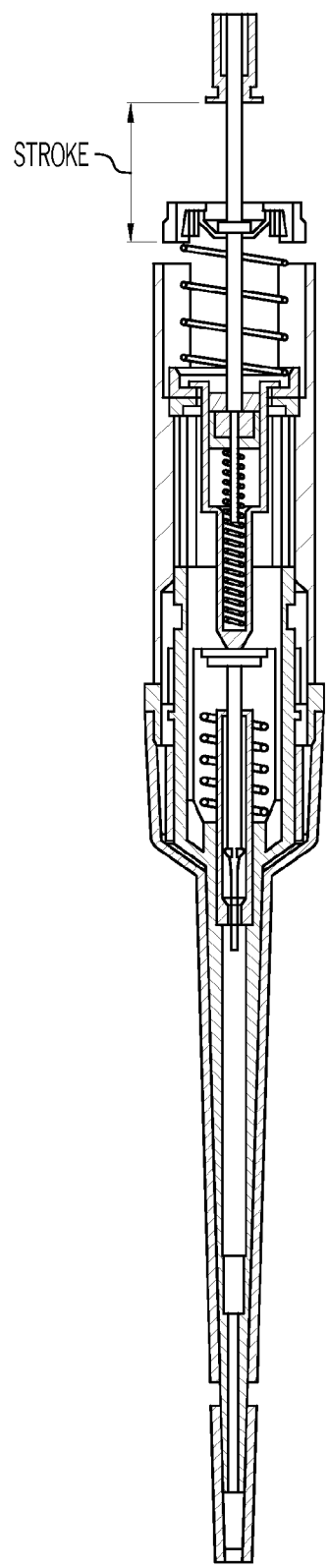

Then, using the pipette 1, the pipette tip 51 can be aligned with the lower end toward another vessel. By pressing the actuating element 4 downward, the stroke rod 6 moves downward and the drive element 34 is shifted downward by means of the decoupling device 44, such that the piston 58 is again moved downward in the cylinder 57. As a result, the set dosing quantity is substantially released. This situation is shown in FIG. 7b.

Residual remaining in the pipette tips 51 can be blown out in that the actuating element 4 is pressed further downward by an increased expenditure of force. In doing so, the lower stop body 27 is shifted downward in the guidance slots 30, counter to the effect of the over-stroke spring 31, and by means of the decoupling device 44, the drive element 34 is shifted further downward which pushes the piston 58 even further into the cylinder 57. During over-stroke, a further over-pressure is created which presses out residual liquid adhering to the interior wall of the pipette tip 51.

Figure 7C:
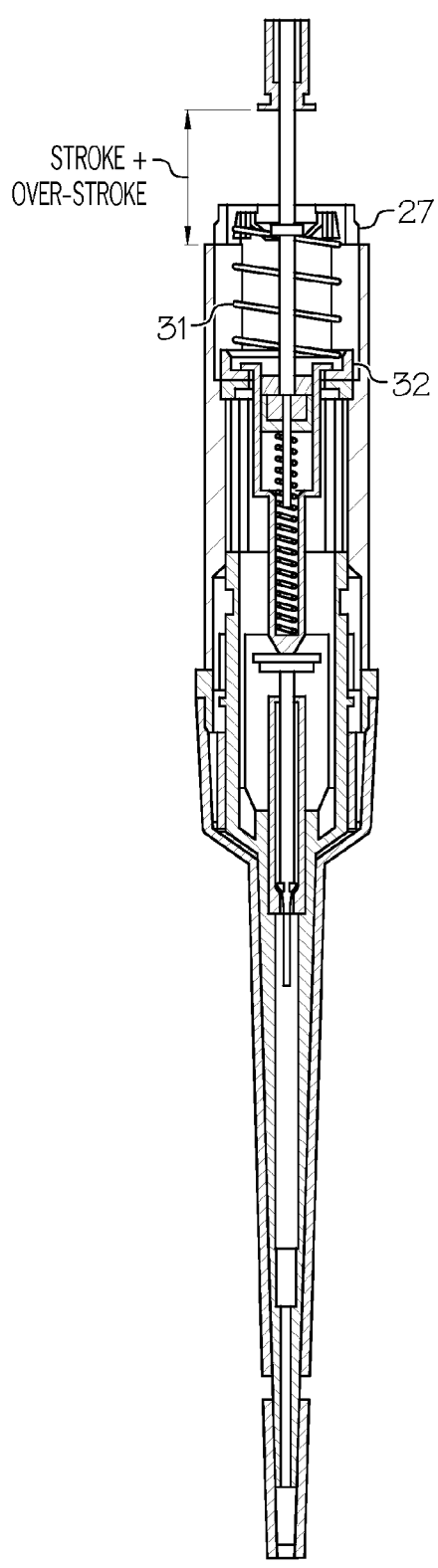

The over-stroke is completed when the drive element 34 with the further collar 38 strikes the over-stroke spring bearing 32 that forms the end stop. At the same time, the projections 29 reach the actuating end 78 of the ejection extension 74, or respectively are located at a very a small offset there above. This situation is shown FIG. 7c.

Then, the pipette tip 51 can be discarded. For this purpose, the actuating element 4 is pressed farther downward by an increased expenditure of force. The over-stroke spring bearing 32 prevents the drive element 34 from moving further downward. Due to the increased force, the magnet 40 is released from the anchor 39, and the stroke rod 6 moves further downward, taking the lower stop body 27 along with it. The lower stop body 27, with the projections 29, presses the ejection extension 74 downward at the actuation ends 78. The ejection extension 74 also takes the ejection slider 72 downward, which with the ejection end 73 presses the pipette tips 51 from the shoulder 50.

Figure 7D:
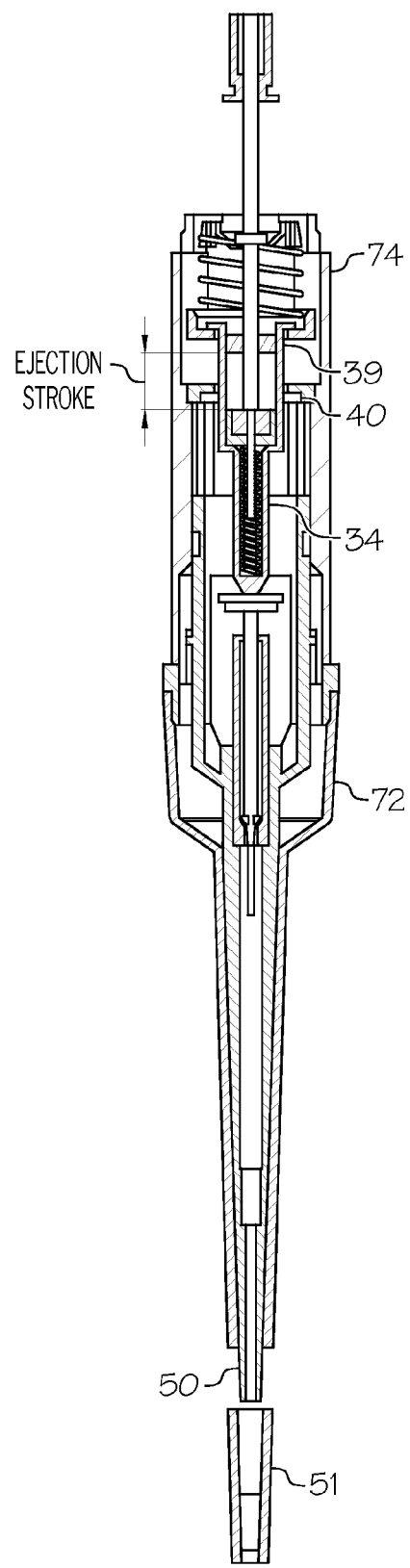

During the ejection stroke, the piston 58 is not moved further downward in the cylinder 57. Consequently, dead volume is not required in the cylinder 57, and the piston 58 does not strike the bottom of the cylinder 57. If the magnet 40 is detached from the anchor 39, the force expenditure for further shifting the actuating element 4 downward is decreased further. The ejection stroke is completed when the ejection extension 74 strikes an ejection stop, not shown, in the housing. This situation is shown in FIG. 7d.

After releasing the actuating element 4, the pipette 1 automatically returns into the initial position shown in FIGS. 1, 2, 5, 6 and 7a. In the process, the ejection spring 81 presses the ejection extension 74 upward, and with it the ejection slider 72. In addition, the decoupling spring 43 presses the stroke rod 6 with the magnet 40 upward until the magnet 40 is held securely at the anchor 39 by magnetic force. Furthermore, the over-stroke spring 31 presses the lower stop body 27 upward until the projections 29 reach the upper ends of the guidance slots 30. Additionally, the piston spring presses the piston 58, the drive element 34, and via the decoupling device 44, the stroke rod 6 upward until the collar 25 abuts the threaded spindle 8.

The upper housing part 2 can be simply connected to another lower housing part 3, where the cylinder 57 and the piston 58 have a different cross section. Correspondingly, the same upper housing part 2 can be used for producing pipettes 1 with different dosing volumes. Furthermore, it is possible in the event of a defect, to simply exchange the lower housing part 3 or the upper housing part 2, or if required, to populate the upper housing part 2 with a different lower housing part 3. In addition, the lower housing part 3 can be easily removed from the upper housing part 2, also for the purpose of maintenance, repair or cleaning.

Figure 8:
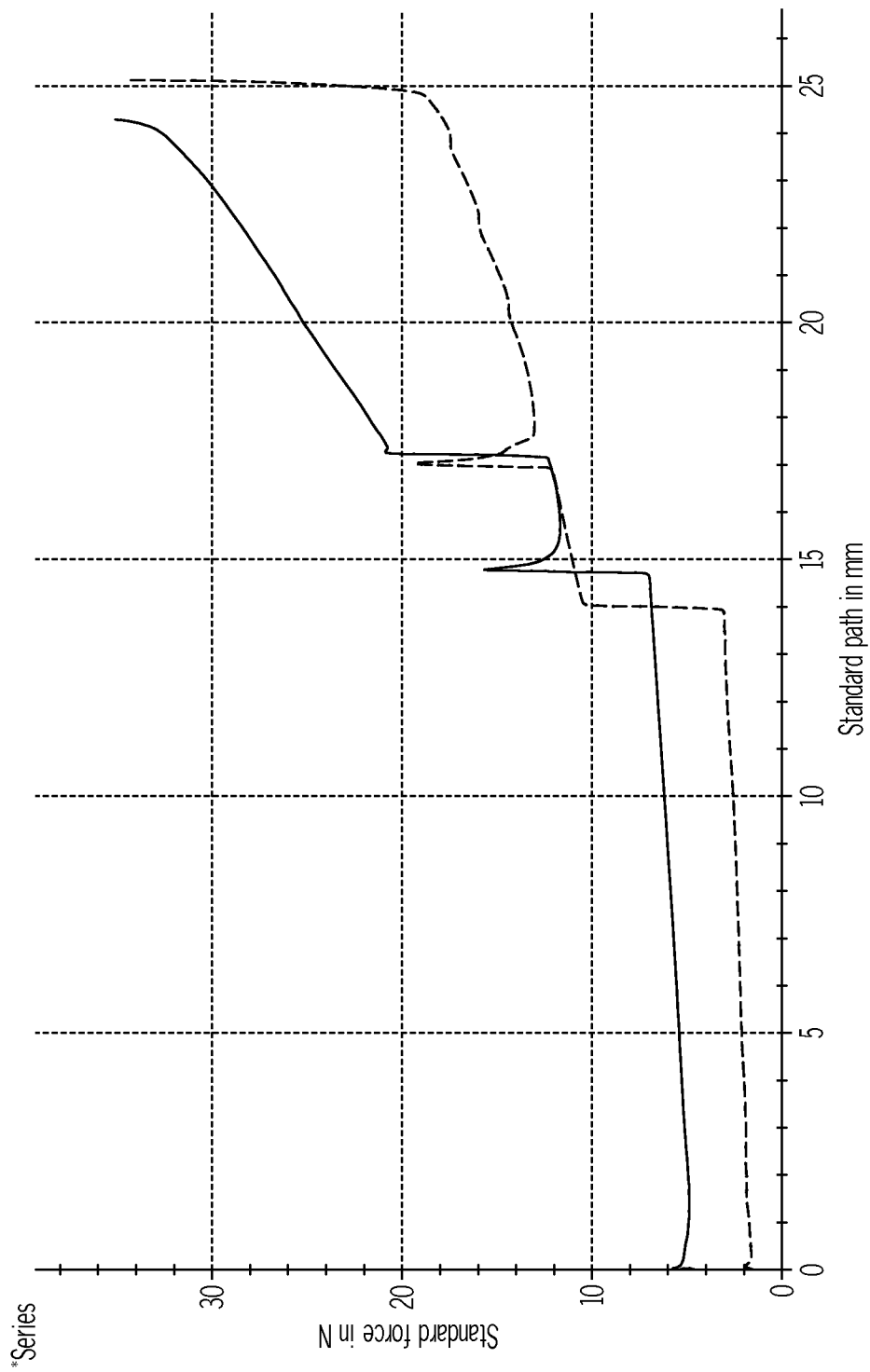
FIG. 8 force-path diagram for the dosing stroke, over-stroke and ejection stroke of a pipette according to the invention (dotted lines) and a conventional pipette (continuous lines).

According to FIG. 8, with the pipette 1 according to the invention, the actuating force to be applied while performing the dosing stroke increases only slightly. The dosing stroke is completed after an actuation path of approximately 14 mm.

For a subsequent over-stroke, initially the force to be applied on the actuating element 4 must be increased sharply, from approximately 3 Newton to approximately 10.5 Newton. Then, an increasing actuating force must be applied for the over-stroke, this force must increase more strongly than the actuating force for performing a dosing stroke. The over-stroke is completed after approximately 17 mm.

For a subsequent ejection stroke, a one-time detachment force of approximately 19 Newton must be applied. Then, the force to be applied for the ejection increases approximately in continuation of the straight line for the over-stroke.

In a customary pipette according to the document DE 25 49 477 C3, a force at an increased level must be applied for the dosing stroke. During transition from the dosing stroke to the over-stroke, a one-time peak force occurs. Also, for detaching the magnets, an escalation of force is necessary to transition to the ejection stroke. During ejection, the actuating force to be applied increases on a higher level, and increases more steeply than with the pipette according to the invention.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

LIST OF REFERENCE NUMBERS USED 1 pipette
2 upper housing part
3 lower housing part
4 actuating element
5 cover of the actuating mechanism
6 cylindrical stroke rod
7 upper passage channel
8 threaded spindle
9 spindle nut
10 stroke body
11 spindle driver
12 hexagon
13 hole
14 inner hexagon
15, 16 radial projections
17, 18 grooves
19 transfer part
20 sprocket
21 counter gearing mechanism
22 counter wheels
23 counter
24 housing cover
25 bead-like collar
26 lower face side
27 lower stop body
28 lower passage channel
29 projection
30 guidance slots
31 over-stroke spring 32 over-stroke spring bearing
33 through hole
34 drive element
35 upper sleeve section
36 lower sleeve section
37 truncated cone-shaped tip
38 further collar
39 hollow-cylindrical anchor
40 hollow-cylindrical magnet
41 pot
42 needle-shaped section
43 decoupling spring
44 decoupling device
45 lower housing opening
46 means for the detachable connection
47 hollow-cylindrical section
48 upper hollow cone section
49 lower hollow cone section
50 conical shoulder
51 pipette tip
52 upper opening
53 lower opening
54 further means for the detachable connection
56 connecting channel
57 cylinder
58 piston
59 O-ring
60 piston seal
61 needle-shaped extension
62 through opening
63 piston plate
64 conical indentation
65 cylindrical end cap
67 upper housing opening
68 projections
69 indentation
70 piston spring
71 ejection direction
72 ejection slider
73 ejection end
74 ejection extension
75 ejection rod
76 ejection ring
77 upper ejection spring bearing
78 actuating end
79 web
80 lower ejection spring bearing
81 ejection spring

The invention claimed is:

1. A pipette with
a displacement unit comprising a rod-shaped lower housing part (3) with a displacement chamber (57) disposed therein with a shiftable boundary (58), a contact element (63), connected to the shiftable boundary (58), at an upper housing opening (67) at the top of the lower housing part (3), a shoulder (50) for connecting to a pipette tip (51) at the bottom of the lower housing part (3), and a connecting channel (56) between the displacement chamber (57) and the free end of the shoulder (50),
a drive unit for driving the shiftable boundary (58) of the displacement unit in a rod-shaped upper housing part (2), a drive device (6) disposed therein, an actuating element (4) at the upper housing part (2) interacting with the drive device (6), and a drive element (34) at a lower housing opening (45) at the bottom of the upper housing part (2), interacting with the drive device (6), the drive element being shiftable downward in the actuating direction by actuating the actuating element (4), in order to perform a dosing stroke of the shiftable boundary (58),
means for a detachable connection (46, 54) that detachably connects together the upper housing part (2) and the lower housing part (3) into a rod-shaped housing in an arrangement in which the drive element (34) rests on the contact element (63),
an ejection device (71) which has an ejection slider (72) shiftably disposed at the lower housing part (3) where the ejection slider on the bottom has an ejection end (73) for detaching a pipette tip (51) from the shoulder (50), and the ejection device (71) further has, shiftably disposed on the upper housing part (2), an ejection extension (74) that is connected at the bottom to the upper end of the ejection slider (72) and at the top has an actuating end (78),
an end stop (32) disposed fixed to the housing in the upper housing part (2) and connected securely to the upper housing part (2), and an end stop element (38) securely connected to the drive element (34) for limiting the downward shift of the drive element (34),
a decoupling device (44) between the drive device (6) and a drive element (34) that decouples the drive element (34) from the drive device (6) in the case of contact of the end stop element (38) at the end stop (32) and continued shifting of the actuating element (4) in the actuating direction, and
coupled to the drive device (6), a lower stop body (27) that upon decoupling of the drive element (34) from the drive device (6) by the decoupling device (44) strikes an actuating end (78) of the ejection extension (74) in order, while further shifting of the actuating element (34) in the actuating direction, to shift downward the ejection extension (74) and the ejection slider (72).

2. The pipette according to claim 1, in which the drive unit (6) has a stop element (25) at a stroke rod of the drive device, an upper stop body (8) and the lower stop body (27), between which the stop element (25) can be shifted in order to perform a dosing stroke, wherein the lower stop body (27) is supported using an over-stroke spring (31) in the upper housing part (2), in order to perform an over-stroke by the end stop element (38) and to shift the ejection extension (74) downward, after performing a dosing stroke, by further shifting of the actuating element (4) in the actuating direction counter to the spring force of the over-stroke spring (31) up to reaching the end stop (32).

3. The pipette according to claim 2, in which the upper stop body (8) can be shifted in the upper housing part (2), and the upper housing part (2) has an adjustment device (4, 9, 10) coupled to the upper stop body (8) for adjusting the position of the upper stop body (8) in the upper housing part (2) and determining the dosing stroke.

4. The pipette according to claim 2, in which the stop element (25) is a collar at the periphery of the stroke rod (6), the stroke rod (6) extends through an upper passage channel (7) of the upper stop body (8) and a passage channel (28) of the lower stop body (27), and the collar (25) is disposed between the upper stop body (8) and the lower stop body (27).

5. The pipette according to claim 1, in which the decoupling device (44) has two decoupling elements (39, 40), of which one decoupling element (40) is connected to the drive device (6) and the other decoupling element (39) is connected to the drive element (34), wherein the decoupling elements (39, 40) are held together, in a detachable manner, in a specific connection position, and after overcoming a specific retaining force can be separated from each other, and can be shifted back into the connection position.

6. The pipette according to claim 5, in which a sleeve has a lower sleeve section (36) and an upper sleeve section (35), wherein the lower sleeve section (36) has a smaller diameter than the upper sleeve section (35), extends through the upper housing opening (67) of the lower housing part (3) and rests with the lower end thereof on the contact element (63), and the decoupling elements (39, 40) are disposed in the upper sleeve section (35).

7. The pipette according to claim 5, in which the decoupling elements comprise two magnets, or one magnet and a ferromagnetic counterpart and/or a latch device and/or a spring device, which hold the decoupling elements in a detachable manner in the connection position.

8. The pipette according to claim 1, in which the drive element (34) is a sleeve, the lower end of which is seated on the contact element (63), and wherein the decoupling device is comprised of two decoupling elements (39, 40) and is disposed in the sleeve, and securely fastened thereto, and is configured as an upper decoupling element (39) with an upper passage hole, and the other decoupling element (40) of the decoupling device (44) is shiftably disposed in the sleeve, and is configured as a decoupling element (40) that is fixed at the lower end of a stroke rod (6), which extends from above into the sleeve and through the upper passage hole, and the sleeve extends through a through hole (33) of the end stop (32), and has a further collar (38) projecting radially outward, which limits the downward movement of the drive element (34) by resting on the upper side of the end stop (32).

9. The pipette according to claim 8, in which a decoupling spring (43) is disposed in the sleeve at the bottom of the lower decoupling element (40), and by means of which the lower decoupling element (40) is supported in the sleeve.

10. The pipette according to claim 1, in which a over-stroke spring (31) is supported at a circular disc-shaped over-stroke spring bearing (32) in the upper housing part, a sleeve passes through a through hole (33) of the over-stroke spring bearing (32), and the over-stroke spring bearing (32) is the end stop for a collar (38) of the sleeve.

11. The pipette according to claim 1, in which at the end of a over-stroke, or at the start of a further shifting of the actuating element (4) in the actuating direction, the lower stop body (27) rests with a outer laterally projecting edge thereof on the actuating end (78) of the ejection extension (74) in order to shift the ejection extension (74) downward as a driver.

12. The pipette according to claim 1, in which the ejection extension (74) is supported in the upper housing part (2) by an ejection spring (81) disposed below a over-stroke spring bearing (32) in the upper housing part (2).

13. The pipette according to claim 12, in which the ejection spring (81) is supported at the top at an upper ejection spring bearing (77) at the ejection extension (74), disposed below the over-stroke spring bearing (32), and at the bottom at a lower ejection spring bearing (80) disposed in the upper housing part (2) and securely fastened to the upper housing part.

14. The pipette according to claim 1, in which the ejection slider (72) is an ejection sleeve, which is guided at the outside of the lower housing part (3) and/or the ejection extension (74), has several parallel ejection rods (75) which are connected by a circular-shaped upper ejection spring bearing (77) together at a distance from the ejection slider (72).

15. The pipette according to claim 1, in which the ejection slider (72) and the ejection extension (74) are connected together by at least one snap connection.

16. The pipette according to claim 15, in which the ejection extension (74) is connected by a first snap connection to an ejection ring (76), and the ejection slider (72) is connected to the ejection ring (76) by a second snap connection.

* * * * *